June 20, 1961 G. R. GILBERT 2,989,372
PRODUCTION OF ALUMINA
Filed Feb. 24, 1955
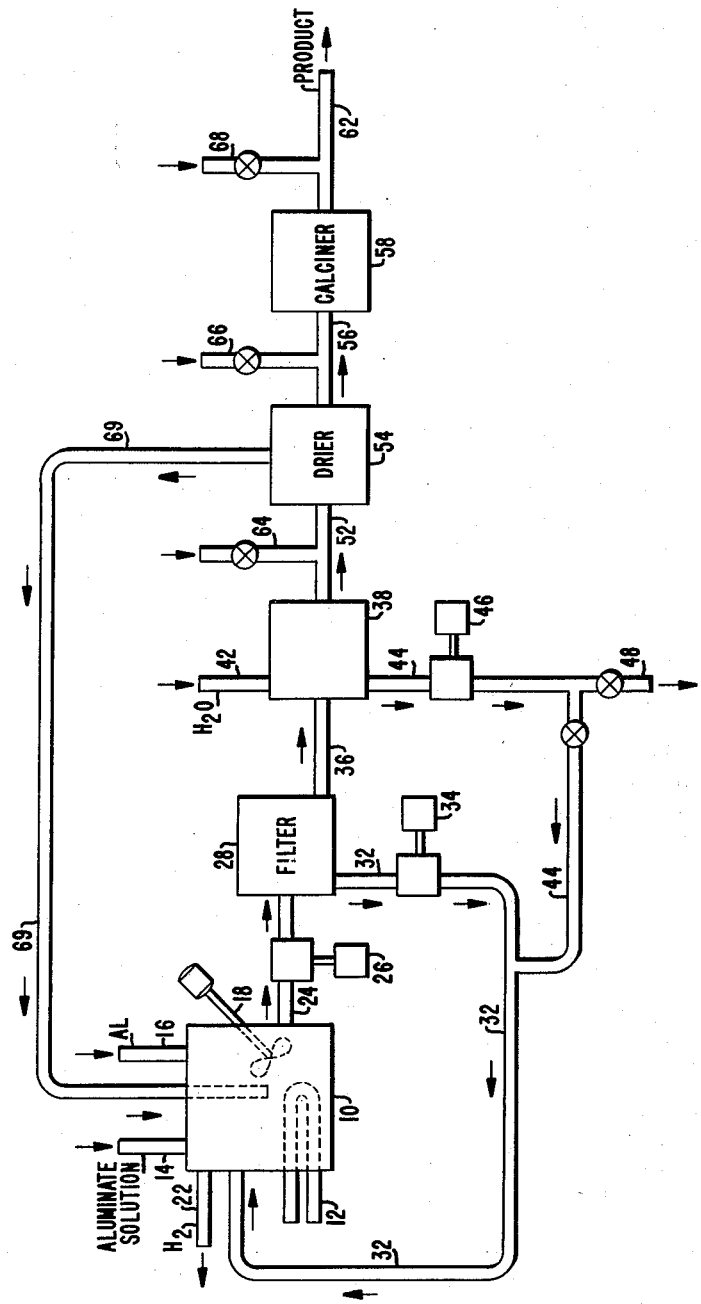
GEORGE R. GILBERT INVENTOR
BY *George J. Sichary* ATTORNEY

United States Patent Office 2,989,372
Patented June 20, 1961

2,989,372
PRODUCTION OF ALUMINA
George R. Gilbert, Elizabeth, N.J., assignor to Esso Research and Engineering Company, a corporation of Delaware
Filed Feb. 24, 1955, Ser. No. 490,349
10 Claims. (Cl. 23—143)

This invention relates to a new and improved method for producing alumina.

Various methods for producing alumina are known but they have drawbacks or limitations which are overcome by the present invention. It is known to react aluminum metal with acetic acid in the presence of a catalyst to form alumina sol which sets to an alumina gel. This process is expensive and is not always reproducible as to the time of gelling of the alumina sol. Aluminum alcoholates may be hydrolyzed with water to form hydrated aluminas which on drying and washing produce a pure alumina. Use of the alcoholates is a fairly expensive method but is an excellent one and one which gives reproducible results. Other methods are known in the art such as the process of making alumina from scale removed from precipitation tanks employed in the precipitation of aluminum hydrate from a sodium aluminate solution by the Bayer process. Other processes include those where alumina is chemically precipitated from soluble aluminum-containing compounds.

According to the present invention alumina is produced by adding aluminum metal to a warm, relatively dilute aqueous alkaline solution of sodium or potassium aluminate. The aluminum metal reacts with the hydroxyl ions present giving off hydrogen and forming aluminum hydroxide precipitate. The precipitated aluminum hydroxide is separated, washed, dried and calcined to form an alumina having a relatively high surface area which is useful as an adsorbent or as a catalyst base or in admixture with other catalytic components to form catalysts. As long as aluminum metal is added, the reaction continues and the process appears to be a continuous one in which OH ions are continuously regenerated to react with more aluminum metal. The total amount of aluminum metal reacting is considerably greater than the amount theoretically needed to react with the excess sodium hydroxide in the sodium aluminate.

Instead of starting with an alkaline solution of sodium or potassium aluminate, aluminum metal and an excess of sodium hydroxide or potassium hydroxide may be reacted to form a metallic aluminate in a relatively concentrated solution. Then water is added and the diluted solution is heated or warmed and aluminum metal then added to produce aluminum hydroxide as above described. Instead of the sodium aluminate compound, the potassium aluminate compound may be used. Instead of using sodium hydroxide to react with aluminum metal to form sodium aluminate, the quaternary ammonium compounds may be used, such as tetrakis, 2 hydroxy-ethyl ammonium hydroxide $(HOCH_2CH_2)_4N$—OH, or similar basic compounds.

In the drawing, the figure diagrammatically represents one form of apparatus adapted for carrying out the invention in a continuous manner.

The invention will first be described specifically in connection with a batch process.

Example 1

About 50 grams of commercial granular sodium aluminate were dissolved in about 500 cc. of water and the solution warmed on a steam bath to a temperature of about 200–210° F. The granular sodium aluminate contained excess sodium hydroxide and had the following composition:

|  | Percent by weight |
|---|---|
| $Na_2O$ | 29.1 |
| $Al_2O_3$ | 40.6 |
| Ignition loss | 26.1 |

Powdered aluminum metal was then added to this solution and the reaction proceeded rapidly with evolution of hydrogen. A white precipitate of aluminum hydroxide formed and settled to the bottom as the aluminum metal reacted with the solution. During the reaction there was some foaming and as the foaming stopped successive additions of aluminum metal were made until a total of about 13.6 grams of aluminum metal had been added. This was in considerable excess of the 1.9 grams (approximately) theoretically required to react with the excess caustic in the sodium aluminate. The 50 grams of the commercial sodium aluminate contained:

$$50 \times .406 = 20.3 \text{ g. of } Al_2O_3$$

and $$50 \times .291 = 14.55 \text{ g. of } Na_2O$$

For 20.3 g. of $Al_2O_3$, 12.35 g. of $Na_2O$ would be necessary to form $NaAlO_2$ (sodium aluminate) according to the following equation:

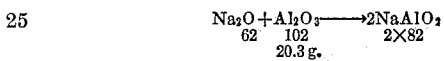

$$20.3 \times 62/102 = 12.35 \text{ g. } Na_2O$$

Therefore, 14.55 − 12.35 = 2.2 grams of $Na_2O$ were present in excess of the theoretical.

To form $NaAlO_2$ from this excess $Na_2O$ and aluminum metal, 1.9 grams of aluminum metal would be necessary, according to the following equation:

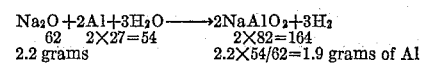

$2.2 \times 164/62 = 5.8$ grams of $NaAlO_2$ would be produced, which is equivalent to:

$$5.8 \times 102/164 = 3.6 \text{ grams of } Al_2O_3$$

However, the alumina recovered from this experiment weighed 34 grams, whereas the theoretical quantity obtainable by complete hydrolysis of the sodium aluminate present in the granules and equivalent to the excess $Na_2O$ present weighed only 20.3 + 3.6 = 23.9 grams.

This is equivalent to a yield of about 142% of the alumina which could be made from the alumina in the original sodium aluminate and the excess caustic, or to 167% of the alumina in the sodium aluminate. This excess was obtained from the aluminum metal added. In addition, the solution was still capable of reacting with more aluminum metal.

At this point the addition of aluminum metal was stopped because the process appeared to be a continuous one in which OH was continuously regenerated in the solution to react with more aluminum metal. The white precipitate was separated by filtration and washed four times with about 500 cc. of water until the pH of the wash water was approximately 7. The recovered filtrate reacted with more aluminum metal in the same way showing that the process is continuous for the production of aluminum hydroxide. The precipitate material was then dried at room temperature and calcined for about 3 hours at 1200° F. About 34 grams of calcined alumina were recovered, whereas there were only about 20.3 grams of alumina in the sodium aluminate. The calcined alumina had a sodium content of only about 0.14% by weight and had a surface area of 188 square meters per gram. The concentration of the aqueous sodium aluminate solution may be between about 1 and 20 parts by weight of the solid sodium aluminate calculated as NaAlO₂ to 100 parts of water by weight, preferably about 7.5 parts of sodium aluminate to 100 parts of water. The temperature during the reaction of the sodium or alkali metal aluminate and the aluminum metal may be between about 60 and 212° F., the reaction going faster at the higher temperatures.

The calcined alumina is useful as an adsorbent and as a catalyst base or in admixture with other catalytic materials to form catalysts. For example, the washed aluminum hydroxide may be mixed with the desired amount of silica hydrosol or silica hydrogel and then dried and calcined to form a silica-alumina cracking catalyst containing at least 12% alumina. In another catalyst preparation a molybdenum-containing solution such as ammonium molybdate may be added to the washed aluminum hydroxide and mulled therewith and the mixture then dried and calcined. Or the ammonium molybdate solution may be added to the calcined alumina and then precipitated by heat or by the use of ammonium hydroxide. Chromium, copper and nickel salt solutions or compounds may be similarly added to the washed aluminum hydroxide or to the calcined alumina. If it is desired to add platinum to the alumina, this can be done by impregnating the calcined alumina with a chlor-platinic acid solution and then reducing the platinum compound to metallic platinum.

*Example 2*

About 200 grams of the same commercially available sodium aluminate used in Example 1 were dissolved in about 2000 cc. of water. The solution was heated on a steam bath to about 200–210° F. About 216 grams of finely divided aluminum metal were added in successive small portions when gas evolution had subsided. Water was added occasionally to replace that lost by evaporation and by chemical reaction. During the reaction of the aluminum metal with the solution, aluminum hydroxide precipitate was formed and settled to the bottom of the reaction vessel. When all the aluminum metal had been added and had disappeared, the white precipitate was filtered from the resulting slurry, washed with water, dried at about 400° F., pulverized, again washed with water and dried at about 400° F. and then calcined for about 3 hours at 1200° F. The recovered calcined alumina weighed 438 grams.

The surface area of the calcined alumina was 154 square meters per gram and its sodium content was about 0.28 weight percent.

A hydroforming catalyst was made from a portion of the alumina made according to Example 2 by dry mixing about 300 grams of the pulverized, calcined alumina with about 33 grams of powdered molybdic acid anhydride and calcining the mixed powdered materials for about 3 hours at about 1200° F. A part of the calcined material or catalyst which contained 10% by weight of molybdenum oxide was used in a hydroforming process in a 275 cc. catalyst bed, at 907° F., the naphtha feed was a virgin naphtha, having a nominal boiling range of 200 to 330° F. and a Research octane number of about 50. The feed rate of naphtha to the hydroforming reactor was 0.51 v./v./hr. where the volume of feed naphtha is measured as liquid. The pressure was about 200 lbs. per sq. in. gage. About 2400 cubic feet of hydrogen were used per barrel of feed during the hydroforming reaction. The yield of hydroformate was about 86% of gasoline having a Research octane number of about 87.6. The cycle was for about 2½ hours.

Referring now to the drawing there is shown an apparatus which is adapted for carrying out a continuous process according to this invention. The reference character 10 designates a mixing and reaction tank or vessel provided with a suitable heating coil 12 to heat the contents of the mixing tank to about 150°–210° F. Inlet line 14 is provided for introducing a dilute alkali metal aluminate solution, such as a dilute sodium aluminate solution and inlet line 16 is provided for the introduction of aluminum metal into tank 10. The aluminum metal may be in the form of powder, turnings, pellets or other small pieces to facilitate introduction into the tank. Stirrer or mixer 18 is provided for gently agitating the contents of the tank 10. Outlet line 22 is provided for removal of hydrogen which is substantially pure hydrogen formed during the reaction and which can be utilized as such as in other reactions. A condenser (not shown) may be used in line 22 to knock back water evaporated and carried out of tank 10 by the evolved gas.

After a batch of dilute sodium aluminate solution has been added and aluminum metal is being added to tank 10, the reaction sets in and aluminum hydroxide and hydrogen are formed. The aluminum hydroxide settles in the bottom of tank 10 and is withdrawn as a slurry through line 24 by pump 26 and passed to filter 28 where the aluminum hydroxide is continuously filtered to recover the aluminum hydroxide precipitate and sodium aluminate solution. The sodium aluminate solution is withdrawn from the filter 28 through line 32 and returned to tank 10 by pump 34. Line 32 may be tied into line 14. It is preferred to add the aluminum metal at intervals and after each addition to let the reaction continue until the aluminum has been completely consumed before making the next addition of aluminum metal. In this way the precipitated aluminum hydroxide may be removed at intervals from the bottom of tank 10 free of aluminum metal. If heavy lumps of metal are used, they sink to the bottom and an aluminum hydroxide-sodium aluminate slurry may be continually withdrawn at some suitable distance above the bottom. A defoaming agent may be added to control foaming. An example of such an agent is silicone oil.

The aluminum hydroxide is then passed through conveyor 36 to tank 38 into which water is introduced through line 42 and the aluminum hydroxide is washed substantially free of sodium ions. The wash water is withdrawn from the wash tank 38 through line 44 and returned to the mixing tank 10 through line 44 or 32 or 14 by pump 46. If desired, a portion of this wash water may be withdrawn from the system through line 48. Preferably, the aluminum hydroxide is washed until the wash water has a pH of about 7. The washed aluminum hydroxide is then passed through conveyor 52 to drier 54 which may be a drum drier or any other suitable drier. From here the dried aluminum hydroxide is passed through conveyor 56 to a calcination zone 58 where the aluminum hydroxide is heated to between about 900 to 1200° F. or higher for a period of about 1 to 3 hours or longer to form alumina from the aluminum hydroxide. The calcined alumina product is withdrawn through line 62 and this product may be used as such as an adsorbent.

Where it is desired to add other catalytic materials to the alumina or where the alumina is to be used as a support for catalysts, impregnating solutions may be added through line 64 to the washed wet aluminum hydroxide in line 52 before drying, or into line 56 through line 66. Or the impregnating solution may be added to the calcined alumina by introducing the impregnating solution into line 62 through line 68.

For example, if it is desired to make a silica-alumina cracking catalyst containing up to about 40% alumina, a silica hydrosol or silica hydrogel may be added to the washed aluminum hydroxide in line 52 via line 64 and the mixture preferably further mixed or mulled to obtain intimate mixing of the ingredients and then this mixture passed to the dryer 54 and calcination zone 58. Or ammonium molybdate may be added to the aluminum hydroxide in line 52 and the resulting mixture dried and calcined, or the resulting mixture may be mulled before being passed to the dryer 54. Salts or compounds of molybdenum, chromium, copper, nickel, platinum etc. may be added as solutions to the calcined product leaving the process through line 62 in order to impregnate the calcined alumina and the impregnated alumina may be further treated as by heat, addition of ammonium hydroxide or the like to precipitate the corresponding oxides of the added metals (except platinum). In the case of platinum the calcined alumina may be impregnated with chlor-platinic acid in an amount so that the final product has about 0.01 to 1% platinum based on the alumina, and the impregnated alumina is then calcined in a reducing atmosphere to reduce the platinum compound to platinum metal.

In the continuous process described in connection with the figure the process is started with a certain amount of dilute sodium aluminate solution and then aluminum metal is continuously or at intervals added to tank 10 without replenishing the sodium aluminate solution. Apparently during the reaction OH-ions are regenerated and the reaction is continuous. Sodium aluminate soultion recovered from the filtered aluminum hydroxide is recycled through line 32 to tank 10. Water is supplied to the mixing tank or reaction vessel 10 from the washing tank 38 where the aluminum hydroxide is washed and this wash water also contains some sodium aluminate. However, some of the sodium aluminate is lost from the system and a small amount of sodium aluminate solution will have to be supplied to tank 10 through line 14. The sodium aluminate which is lost may vary from about 0.1 to 5% or higher, but is generally about 0.5%.

About 2000 lbs. of sodium aluminate are dissolved in 2500 gallons of water and the solution introduced into mixing tank 10 where it fills the tank to about half to ⅔. A small quantity of defoamer is added, such as silicone oil. The solution is heated to about 200° F. and granular aluminum metal is then introduced at the rate of about 20 or more lbs. per hour. Aluminum hydroxide is recovered in the filter 28 from the water slurry removed from the bottom of tank 10 through line 24. After washing, drying and calcining about 37.5 lbs. of high surface area alumina are recovered per hour. Recycling of the sodium aluminate solution to line 32 from filter 28 accounts for about 95% of the sodium aluminate solution passing to the filter 28 from tank 10 through line 24. Part or all of the water used for washing the aluminum hydroxide is returned to tank 10 as make-up water for the reaction. This contains about 5% of the sodium aluminate solution from line 24 to the filter. About 37.5 lbs. of water per hour are recycled to the tank through line 44 and about 100 lbs. of water per hour are discarded, if necessary, depending upon the efficiency of washing as well as the degree of washing. Steam driven off from drier 54 may be sent through insulated line 69 to supply at least some of the heat for reaction vessel 10 by heat exchange or by direct addition of the steam to the solution.

Instead of starting with sodium aluminate solution in dilute form in the mixing tank or reaction vessel 10, aluminum metal and concentrated caustic may be introduced into the tank 10 through line 14 to form a concentrated solution of sodium aluminate. For example, 800 lbs. of aluminum metal in the form of granules, pellets, powder, etc. are reacted with 750 lbs. of sodium hydroxide, dissolved in 500 gallons of water at a temperature of 200-212° F. to form a concentrated solution of sodium aluminate of about 40 parts by weight of sodium aluminate per 100 parts by weight of water. Water is added to replace that lost by evaporation and chemical reaction. Then sufficient water is added to the concentrated solution to make a dilute solution of the sodium aluminate of about 7.5 parts by weight sodium aluminate per 100 parts by weight of water, and the solution is then warmed to between about 150–210° F. and the introduction of aluminum metal is started to carry out the process of the present invention. Other methods of making the alkali metal aluminate may be used.

For example, 1050 lbs. of KOH may be dissolved in 500 gallons of water and reacted with aluminum metal to make a concentrated potassium aluminate solution, which is used in the same way as the sodium aluminate solution as above described to make alumina.

What is claimed is:

1. A process for the production of alumina which comprises reacting aluminum metal in a reaction zone with a dilute aqueous solution of sodium aluminate containing excess sodium hydroxide and containing sodium aluminate in a concentration between about 1 and 20 parts by weight (calculated as $NaAlO_2$) per 100 parts by weight of water to form and precipitate aluminum hydroxide, recovering the precipitated aluminum hydroxide from the dilute aqueous sodium aluminate solution and drying and calcining the recovered aluminum hydroxide to produce alumina.

2. A process according to claim 1 wherein the temperature during the reaction is maintained between about 150° and 210° F.

3. A process according to claim 1 for continuously reacting added amounts of aluminum metal to a selected original volume of dilute sodium aluminate solution wherein the precipitated aluminum hydroxide is recovered by filtering and the filtrate is further reacted with added amounts of aluminum metal periodically introduced into said reaction zone to produce additional precipitated aluminum hydroxide without replenishing the alkali metal aluminate in said filtrate.

4. A process according to claim 1 wherein the sodium aluminate solution separated from the aluminum hydroxide precipitate is further reacted with aluminum metal without the addition of fresh sodium aluminate solution.

5. A process for the production of alumina which comprises introducing a dilute aqueous solution of sodium aluminate containing an excess of sodium hydroxide and containing sodium aluminate in a concentration between about 1 and 20 parts by weight (calculated as $NaAlO_2$) per 100 parts by weight of water into a reaction zone, then adding aluminum metal without the further addition of sodium aluminate to form aluminum hydroxide precipitate, removing aluminum hydroxide precipitate as a slurry from the bottom of said reaction zone, filtering said slurry and recycling the filtrate containing sodium aluminate to said reaction zone, then adding more aluminum metal and reacting a further amount of aluminum metal with said recycled filtrate in said reaction zone without the addition of fresh sodium aluminate solution to said reaction zone.

6. A process according to claim 5 wherein the filtered aluminum hydroxide is washed, dried and calcined to produce alumina.

7. A process according to claim 5 wherein the sodium aluminate is in a concentration between about 7.5 and 10 parts by weight per 100 parts by weight of water.

8. A process of preparing alumina which comprises reacting aluminum metal and concentrated sodium hydroxide to form a concentrated solution of sodium aluminate, then diluting the sodium aluminate solution with water to a concentration of about 10 parts by weight of sodium aluminate (calculated as $NaAlO_2$) per 100 parts by weight of water, then reacting metallic aluminum with said diluted sodium aluminate in a reaction zone to form aluminum hydroxide precipitate and recovering the aluminum hydroxide precipitate from the dilute sodium aluminate solution, reacting adidtional aluminum with the separated dilute sodium aluminate without adding fresh sodium aluminate to form additional aluminum hydroxide precipitate and drying and treating the aluminum hydroxide precipitate to produce alumina.

9. A process according to claim 8 wherein water is periodically added to said reaction zone.

10. A process for the production of alumina which comprises introducing a dilute aqueous solution of sodium aluminate containing a slight excess of sodium hydroxide and containing sodium aluminate in a concentration of about 10 parts by weight (calculated as $NaAlO_2$) per 100 parts by weight of water into a reaction zone, then adding aluminum metal without the further addition of sodium aluminate to form aluminum hydroxide precipitate, removing aluminum hydroxide precipitate as a slurry from the bottom of said reaction zone, filtering said slurry and recycling the filtrate containing sodium aluminate to said reaction zone, then adding more aluminum metal and reacting a further amount of aluminum metal with said recycled filtrate in said reaction zone without the addition of fresh sodium aluminate solution to said reaction zone, whereby OH ions are continuously regenerated in the solution during the reaction to continuously react with more added aluminum metal and the alumina recovered is greatly in excess of the theoretical quantity obtainable by complete hydrolysis of the sodium aluminate present and the quantity equivalent to the excess sodium hydroxide present in the dilute sodium aluminate solution.

References Cited in the file of this patent

UNITED STATES PATENTS

| | | |
|---|---|---|
| 1,262,062 | Lawrie | Apr. 9, 1918 |
| 2,068,640 | Baumbauer et al. | Jan. 26, 1937 |
| 2,380,804 | Tiedeman | July 31, 1945 |
| 2,527,723 | Hansgirg | Oct. 31, 1950 |
| 2,608,469 | McMaster | Aug. 26, 1952 |
| 2,668,751 | Porter | Feb. 9, 1954 |

OTHER REFERENCES

Chemical Engineering, November 1954, pp. 334–337, "Increase Yield of Alumina."

The Aluminum Industry, by J. D. Edwards et al., 1st ed. 1930, published by McGraw-Hill Book Co., Inc., pp. 124–131.